(12) United States Patent
Buchegger

(10) Patent No.: US 7,946,704 B2
(45) Date of Patent: May 24, 2011

(54) SPRING HINGE BETWEEN A BOW CHEEK AND A BOW OF A PAIR OF SPECTACLES

(75) Inventor: Harald Buchegger, Scharnstein (AT)

(73) Assignee: Redtenbacher Präzisionsteile Ges.m.b.H., Scharnstein (AT)

( * ) Notice: Subject to any disclaimer, the term of this patent is extended or adjusted under 35 U.S.C. 154(b) by 0 days.

(21) Appl. No.: 12/590,100

(22) Filed: Nov. 2, 2009

(65) Prior Publication Data

US 2010/0128218 A1     May 27, 2010

(30) Foreign Application Priority Data

Nov. 21, 2008 (AT) ................................ A 1820/2008

(51) Int. Cl.
*G02C 5/22* (2006.01)
(52) U.S. Cl. ........................ 351/153; 351/114; 16/228
(58) Field of Classification Search .................. 351/111, 351/113, 114, 153; 16/228
See application file for complete search history.

(56) References Cited

U.S. PATENT DOCUMENTS

| | | | |
|---|---|---|---|
| 4,991,258 A | 2/1991 | Drlik | |
| 6,814,438 B2 | 11/2004 | Desbiez-Piat | |
| 7,735,193 B2 | 6/2010 | Buchegger | |
| 2007/0192991 A1 | 8/2007 | Buchegger | |
| 2010/0162525 A1* | 7/2010 | Wienicke et al. | ............... 16/228 |

FOREIGN PATENT DOCUMENTS

| | | |
|---|---|---|
| AT | 502 196 | 2/2007 |
| WO | WO 2006/053983 | 5/2006 |
| WO | WO 2008/087050 | 7/2008 |

* cited by examiner

*Primary Examiner* — Huy K Mai
(74) *Attorney, Agent, or Firm* — Collard & Roe, P.C.

(57) ABSTRACT

A spring hinge between a bow cheek and a bow of a pair of spectacles is described, having two hinge parts (3, 4), which are each associated with one of these spectacle parts (1, 2), one of which forms a bearing fork (6) having a hinge axis (5) for receiving the other hinge part (4), which is guided so it is displaceable in a housing (9) with the aid of a U-shaped sliding part (7), and having a coiled spring (12) situated between the two legs (11) of the sliding part (7), which is supported on one side on a web (13) of the sliding part (7) connecting the two legs (11) and on the other side on a buttress (14), which engages through a through opening (16) of the associated hinge part (4), which runs coaxially to the coiled spring (12), in a nut thread (15) of the housing (9) which is coaxial to the coiled spring (12). In order to provide advantageous construction and installation conditions, it is proposed that the hinge part (3) forming the bearing fork (6) forms an insert which is inserted so it is removable in a laterally closed receptacle pocket (17) of the associated spectacle part (1).

2 Claims, 1 Drawing Sheet

US 7,946,704 B2

SPRING HINGE BETWEEN A BOW CHEEK AND A BOW OF A PAIR OF SPECTACLES

CROSS REFERENCE TO RELATED APPLICATIONS

Applicant claims priority under 35 U.S.C. §119 of Austrian Application No. A 1820/2008 filed on Nov. 21, 2008.

FIELD OF THE INVENTION

The invention relates to a spring hinge between a bow cheek and a bow of a pair of spectacles having two hinge parts, each associated with one of these spectacle parts, one of which forms a bearing fork having a hinge axis for receiving the other hinge part, which is guided so it is displaceable in a housing with the aid of a U-shaped sliding part, and having a coiled spring situated between two legs of the sliding part, which is supported on one side on a web of the sliding part which connects the two legs and on the other side on a buttress, and which engages through a passage opening of the associated hinge part, which runs coaxially to the coiled spring, in a nut thread of the housing, which is coaxial to the coiled spring.

DESCRIPTION OF THE PRIOR ART

In order to situate a spring hinge, whose hinge parts are typically situated on the inner side of the bow cheek and the bow of a pair of spectacles, in a concealed manner, inserting the cheek-side hinge part which forms a bearing fork into a receptacle pocket of the bow cheek and also implementing the housing, which receives the bow-side, spring-loaded hinge part so it is displaceable, as an insert enclosed by the bow is known in plastic spectacles (WO 2006/053983 A1), so that the hinge parts essentially protrude only beyond the front faces of the bow cheek and/or the bow and are not recognizable when the bow is opened, because the front faces of the bow cheek and the bow are pressed flatly against one another by the spring hinge. Only a recess on the cheek inner side, which is required for the pivoting of the bow-side hinge part, remains. However, it is disadvantageous that the hinge axis must be inserted through a through opening in the bow cheek, which not only causes assembly difficulties, but rather also permits the inserted hinge axis to be externally recognized.

In addition, to ensure simple assembly conditions, providing the bow-side hinge part with a U-shaped sliding part which engages in a housing recess is known in spring hinges (AT 502 196 B1), the sliding part receiving a coiled spring between its two legs, which is supported on one side on the web connecting the two legs of the sliding part and on the other side on a buttress, which is screwed into a nut thread of the housing coaxial to the coiled spring, through a coaxial through opening of the bow-side hinge part. Such a design represents an advantageous condition for a housing closed in the peripheral direction, which can be inserted in a spectacle bow without difficulties from the front side. However, for the concealed insertion of such a known spring hinge, the difficulties occurring in the area of the bow cheek remained unsolved. In a refinement of this known spring hinge, it is proposed according to prior art which has not been previously published that the cheek-side hinge part having the bearing fork receiving the hinge axis be anchored in a laterally closed receptacle pocket of the bow cheek, so that the hinge axis does not have to be inserted through the bow cheek. However, this requires the subsequent insertion of the bow-side hinge part, which is already articulated with the cheek-side hinge part, into the bow-side housing, which is only possible if the bow cheek exposes a passage for the buttress which is coaxial to the coiled spring in the pivoted-in position of the bow, so that the buttress for the coiled spring can be screwed in to a corresponding threaded hole in the bow-side hinge housing.

SUMMARY OF THE INVENTION

The invention is thus based on the object of implementing a spring hinge between a bow and a bow cheek of the type described at the beginning so that a concealed configuration is possible, and under the condition that the spectacle part receiving the hinge part having the bearing fork does not have to be provided with a passage opening for the hinge axis or with a passage for the buttress.

The invention achieves the stated object in that the hinge part forming the bearing fork forms an insert, which is inserted so it is removable into a laterally closed receptacle pocket of the associated spectacle part.

Because of the laterally closed receptacle pocket of the spectacle part, the hinge axis is only held in the bearing fork of the cheek-side hinge part, so that through holes in the bow cheek for inserting the hinge axis are dispensed with. However, because the hinge part having the bearing fork is fastened so it is removable in the receptacle pocket of the associated spectacle part, it can also be anchored in the receptacle pocket after the insertion of the other hinge part articulated thereto in the associated housing, so that the spectacle part forming the receptacle pocket can be designed without consideration of the requirements in regard to the insertion of the buttress for the coiled spring into the housing of the other spectacle part, and with the additional advantage of installation simplification. With the possibility of connecting the two hinge parts after the insertion of the spring-loaded hinge part which forms the sliding part into its housing by pushing in the hinge axis, the necessity is dispensed with of ensuring free access of the buttress for the coiled spring to the through hole in the housing past the hinge axis, so that recesses of the hinge axis which are otherwise required for this purpose become superfluous.

Different measures may be taken for fastening the hinge part to the bearing fork in the receptacle pocket. However, particularly simple construction conditions result if the hinge part forming the bearing fork has a fastening flange which terminates the receptacle pocket, and which is fastened to the associated spectacle part with the aid of screws.

BRIEF DESCRIPTION OF THE DRAWING

The object of the invention is shown for exemplary purposes in the drawing. In the figures.

DESCRIPTION OF THE PREFERRED EMBODIMENT

Figure 1:
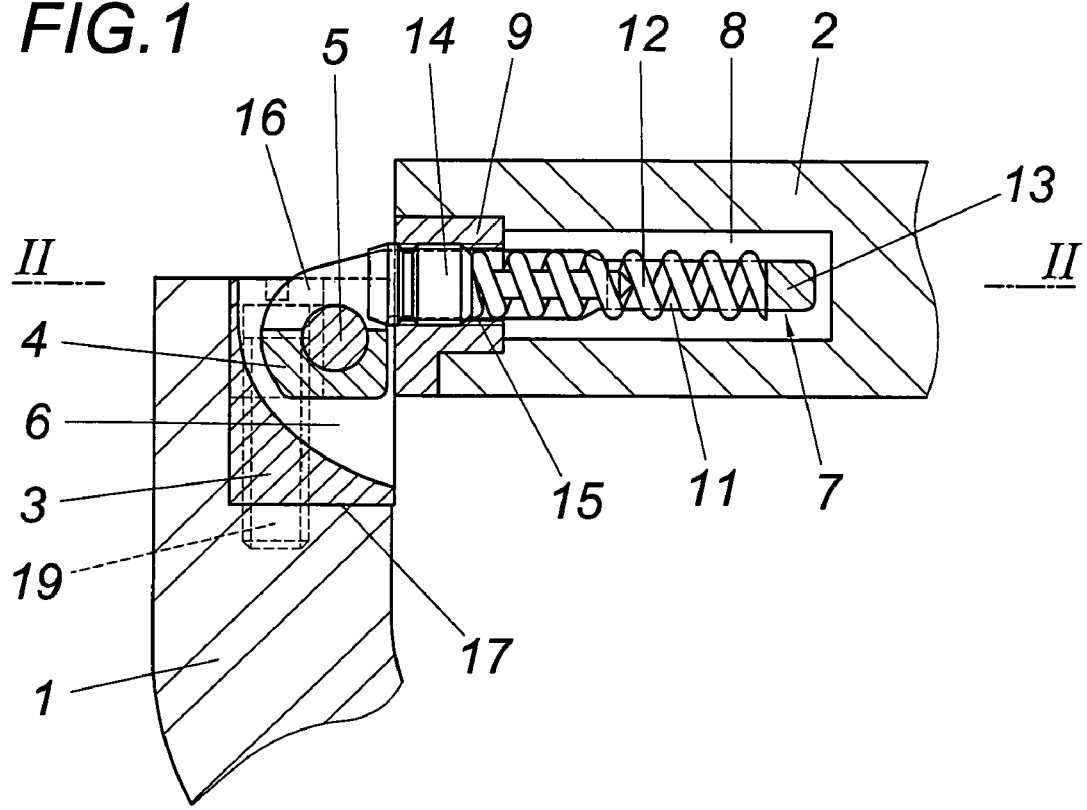
FIG. 1 shows a spring hinge of a pair of spectacles according to the invention in a schematic longitudinal section with angled bow and FIG. 2 shows a section along line II-II of FIG. 1.

The spring hinge shown has two hinge parts 3, 4, each associated with one spectacle part 1, 2, namely a bow cheek and a bow, which are articulated with one another with the aid of a hinge axis 5. The hinge part 3 forms a bearing fork 6, in which the hinge part 4 engages. The typically bow-side hinge part 4, which can also be associated with the bow cheek, however, carries a U-shaped sliding part 7, which is guided so it is displaceable in a housing 9, which terminates a receptacle opening 8 in the associated spectacle part 2. This housing 9 is fastened with the aid of fastening screws 10 on the front side of the bow part 2. A coiled spring 12 is provided between the legs 11 of the sliding part 7, which is supported on one side on a web 13, which connects the two legs 11 to one another, and on the other side on a buttress 14, which is screwed into a nut thread 15 of the housing 9, which is coaxial to the coil axis, and through a through opening 16 running coaxially to the coiled spring 12, as can be inferred from FIG. 1.

Figure 2:
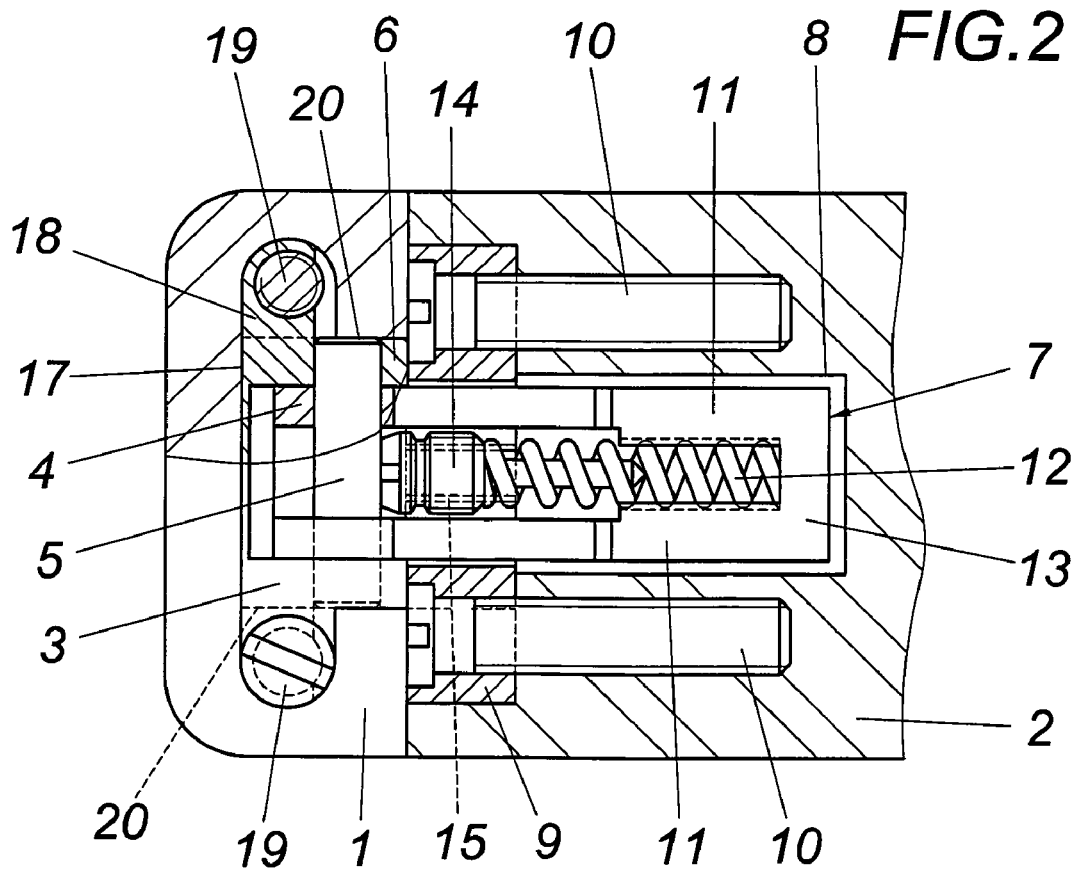

The hinge part 3 associated with the spectacle part 1, typically a bow cheek, forms an insert engaging in a receptacle pocket 17 of this spectacle part 1, which is fastened so it is removable in the receptacle pocket 17. For this purpose, the hinge part 3 forms a fastening flange 18, which frontally terminates the receptacle pocket 17, and which is screwed in place on the spectacle part 1 with the aid of screws 19. As may be inferred from FIG. 2, the receptacle pocket 17 is laterally closed, so that the hinge axis 5 is axially fixed between the side jaws 20 of the receptacle pocket 17.

To install the spring hinge, firstly the hinge part 4 having the coiled spring 12 inserted in the U-shaped sliding part 7 is introduced into the housing 9 and the buttress 14 for the coiled spring 12 is screwed into the nut thread 15. The hinge part 3 can then be articulated with the hinge part 4, in that the hinge axis 5 is inserted through the aligned bearing holes of these hinge parts 3, 4. Finally, the hinge part 3 is inserted into the receptacle pocket 17 and connected to the associated spectacle part 1 with the aid of the screws 19.

The invention claimed is:

1. A spring hinge between first and second spectacle parts comprising a bow cheek and a bow of a pair of spectacles, said spring hinge having first and second hinge parts, each hinge part being associated with one of the first and second spectacle parts, wherein the first hinge part comprises a bearing fork having a hinge axis for receiving the second hinge part, said second hinge part being guided so said second hinge part is displaceable in a housing with the aid of a U-shaped sliding part comprising first and second legs and a web connecting the first and second legs, and having a coiled spring situated between the first and second legs of the sliding part and supported on one side on the web of the sliding part connecting the first and second legs and on the other side on a buttress engaging in a nut thread of the housing coaxial to the coiled spring through a through opening of the second hinge part running coaxially to the coiled spring, wherein the first hinge part is removably inserted into a laterally closed receptacle pocket of the spectacle part associated with the first hinge part.

2. The spring hinge according to claim 1, wherein the first hinge part has a fastening flange terminating the receptacle pocket and fastened on the spectacle part associated with the first hinge part with the aid of screws.

\* \* \* \* \*